(12) United States Patent
Loose et al.

(10) Patent No.: US 12,319,247 B1
(45) Date of Patent: Jun. 3, 2025

(54) DEVICE, SYSTEMS, AND METHODS FOR MOUNTING ARTICLES TO A VEHICLE CHASSIS

(71) Applicant: DAYS LLC, Elkhart, IN (US)

(72) Inventors: Jason Loose, Elkhart, IN (US); Stephen C. Jung, Plymouth, IN (US)

(73) Assignee: DAYS LLC, Elkhart, IN (US)

( * ) Notice: Subject to any disclaimer, the term of this patent is extended or adjusted under 35 U.S.C. 154(b) by 894 days.

(21) Appl. No.: 16/872,341

(22) Filed: May 11, 2020

Related U.S. Application Data

(60) Provisional application No. 62/846,629, filed on May 11, 2019.

(51) Int. Cl.
  *B60S 9/04* (2006.01)
  *B60S 9/22* (2006.01)
  *B62D 25/20* (2006.01)

(52) U.S. Cl.
  CPC ............ *B60S 9/22* (2013.01); *B62D 25/2081* (2013.01)

(58) Field of Classification Search
  CPC ...... B60S 9/00; B60S 9/04; B60S 9/10; B60S 9/12
  See application file for complete search history.

(56) References Cited

U.S. PATENT DOCUMENTS

| | | | | |
|---|---|---|---|---|
| 3,888,464 | A  * | 6/1975 | Felsen ....................... | B66F 3/44 |
| | | | | 254/425 |
| 6,361,023 | B1 * | 3/2002 | Peavler ............. | B62D 25/2081 |
| | | | | 254/420 |
| 2002/0100901 | A1* | 8/2002 | Topelberg ................ | B60S 9/12 |
| | | | | 254/423 |
| 2011/0073821 | A1* | 3/2011 | Nirenberg ................ | B60S 9/14 |
| | | | | 254/420 |
| 2015/0197220 | A1* | 7/2015 | Lusty ....................... | B66F 3/02 |
| | | | | 254/420 |

* cited by examiner

*Primary Examiner* — Lee D Wilson
(74) *Attorney, Agent, or Firm* — Clark Hill PLC

(57) ABSTRACT

This invention is devices and systems comprising a mounting bracket formed to mount a leveling jack or other component to a vehicle chassis without requiring drilling or welding of the bracket to the chassis.

6 Claims, 15 Drawing Sheets

DEVICE, SYSTEMS, AND METHODS FOR MOUNTING ARTICLES TO A VEHICLE CHASSIS

CLAIM TO BENEFIT OF EARLIER FILED APPLICATION

This application claims the benefit of the earlier filed U.S. Provisional Patent Application No. 62/846,629 filed on May 11, 2019.

FIELD OF THE INVENTION

This invention relates devices, systems, and methods for attaching articles and implements, such as a leveling jack, to a vehicle chassis. More specifically, this invention relates to devices and methods comprising a mounting bracket formed to mount a leveling jack to a vehicle chassis without requiring drilling or welding of the bracket to the chassis.

BACKGROUND

Vehicle manufacturers make or buy vehicle chassis for use in their vehicles. Chassis are the main support structure of a motor vehicle to which other components are attached. In order to preserve the safety and integrity of the vehicles comprising the chassis, vehicle and chassis manufacturers commonly provide standards and requirements with respect to the manipulation and/or installation of components on their chassis.

For example, Mercedes-Benz® requires that the chassis of its line of Sprinter® brand vehicles may not be drilled into or amended by welding for the purpose of attaching to the chassis an after-market component, such as a leveling jack. Such requirements present a unique challenge for installers and users of leveling jacks on such vehicles, particularly because leveling jacks are designed to bear the entire weight of the vehicle and thus the connection between the chassis and the jacks must be reliable and robust.

Accordingly, there exists an unmet need in the prior art for devices and methods of reliably connecting components, particularly leveling jacks, to such chassis by means that preferably excludes drilling and welding.

SUMMARY

In order to resolve the aforementioned unmet need of the prior art, the present disclosure provides devices, systems, and methods for securing components to a vehicle chassis, preferably using a mounting bracket, wherein a connection of the bracket to the chassis is made without welding to or drilling into the chassis.

Preferred embodiments of the invention are devices, methods, and systems for securing components to a vehicle chassis, the devices, methods, and systems comprising:
 a vehicle chassis having first, second, and third chassis surfaces and one or more chassis apertures provided along a length of the vehicle chassis;
 a mounting bracket having one or more bracket apertures, a bracket lip, a bracket chassis interface, and a bracket component interface;
 a component having a component bracket interface comprising a plurality of component bracket interface apertures; and
 at least one bracket fastener and at least one component fastener;
 wherein the one or more chassis apertures are complementary to and configured to align together with the one or more bracket apertures;
 wherein the bracket lip has a first side and a second side;
 wherein the bracket chassis interface has a first side and a second side;
 wherein the bracket component interface has a first side, a second side, connecting portions, and a plurality of bracket component interface apertures that are complementary to and configured to align together with the one or more of the component bracket interface apertures;
 wherein the first side of the bracket lip is connected to the first surface of the chassis;
 wherein the first side of the bracket chassis interface is connected to the second surface of the chassis;
 wherein the first side of the bracket component interface is connected to the third surface of the chassis;
 wherein the at least one bracket fastener extends through at least one of the bracket apertures and at least one of the chassis apertures that are aligned together; and
 wherein the at least one component fastener extends through at least one of the bracket component interface apertures and at least one of the component bracket interface apertures that are aligned together.

DETAILED DESCRIPTION

Figure 1:
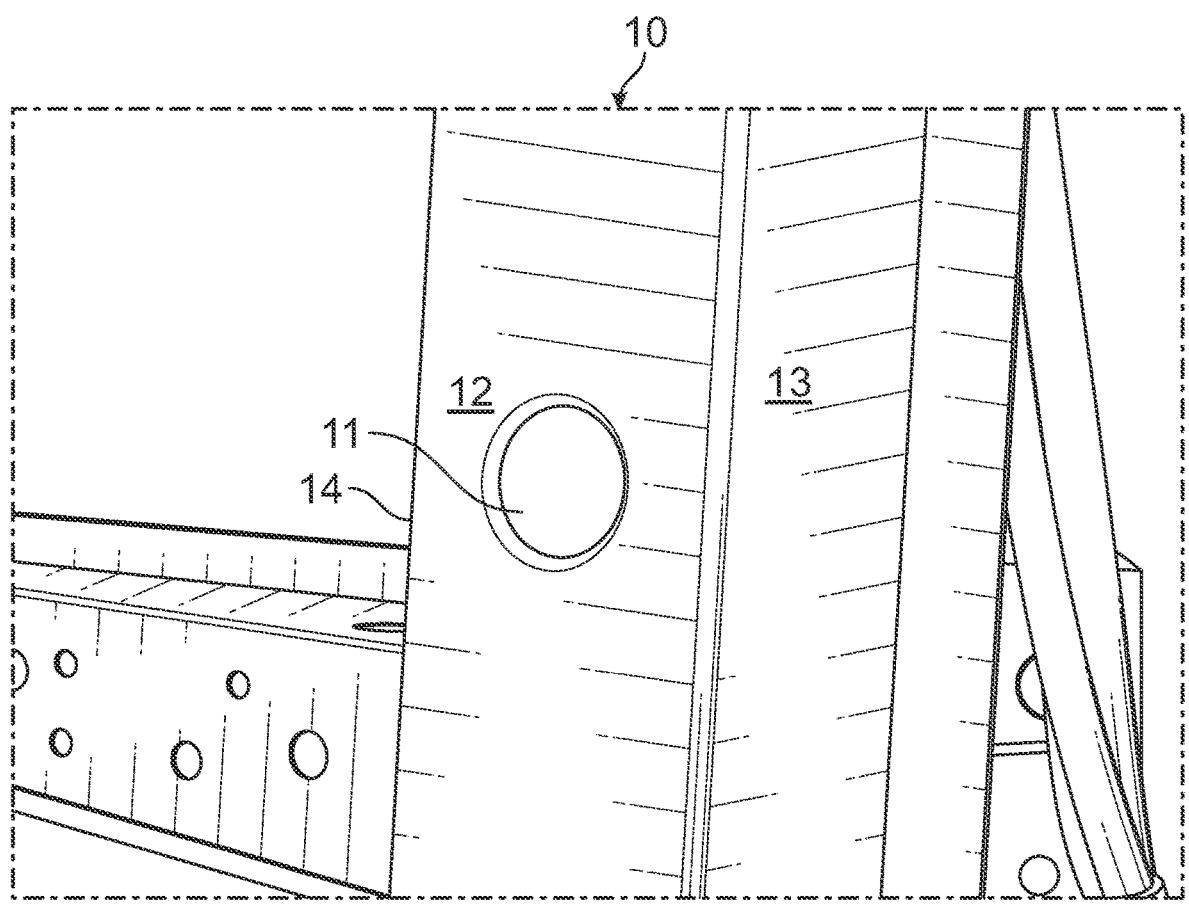
FIG. 1 is a perspective view of a portion of a vehicle chassis showing apertures provided therein by an original equipment manufacturer ("OEM") of the chassis.

As shown in FIGS. 1-14, a system 1 provided in accordance with a preferred embodiment of the present invention comprises a vehicle chassis 10, a mounting bracket 20, a component 40, and one or more fasteners 50. In a preferred embodiment of the present invention, the bracket 20 is fastened to the chassis 10 by means of the fastener 50, and a component 40 is connected to the bracket 20 by means of additional fasteners 50.

As best shown in FIG. 1, the chassis 10 further comprises one or more chassis apertures 11 along a length of the chassis 10, and first, second, and third surfaces 12, 13, 14. As will be discussed in further detail below, the chassis apertures 11 are complementary to and configured to align with bracket apertures 21 (see FIG. 3).

Figure 2:
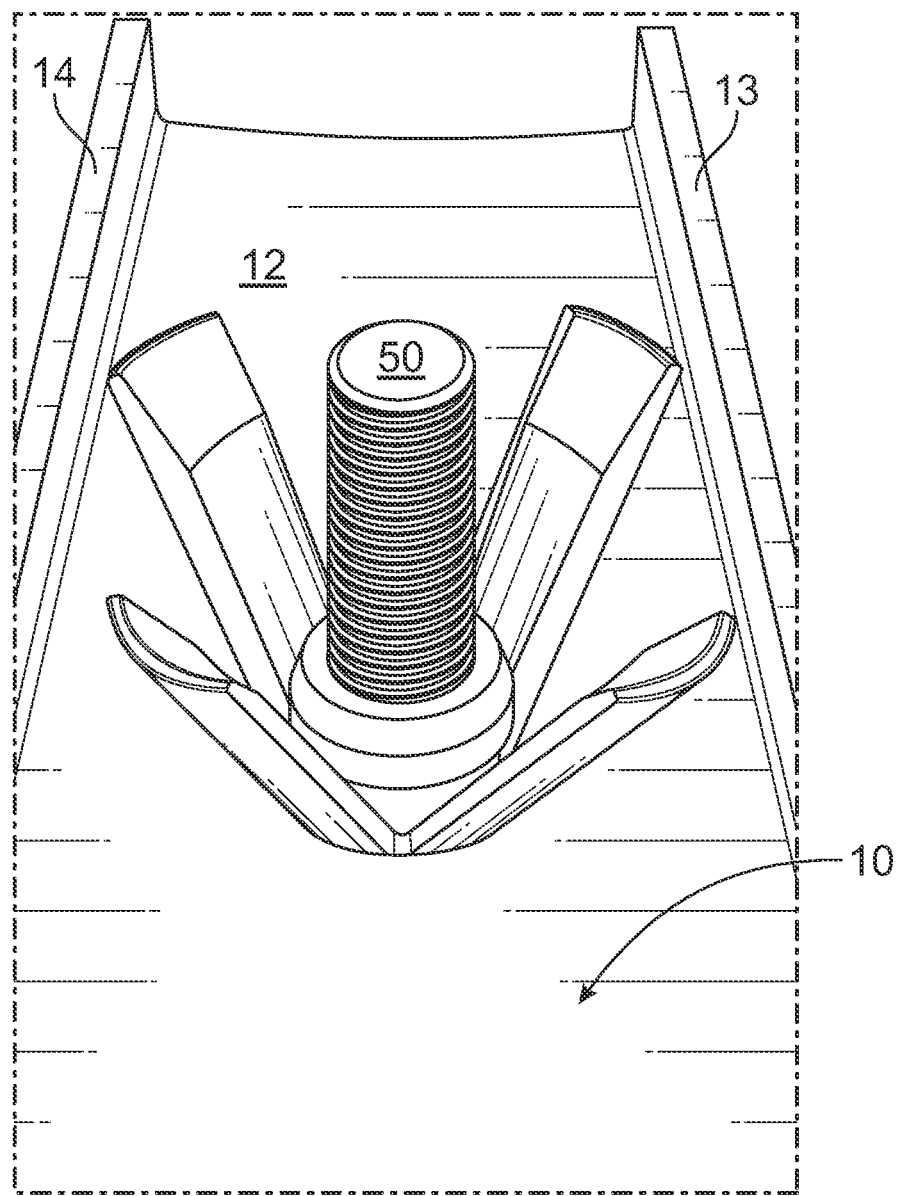
FIG. 2 is a perspective view of a fastener used to connect a component to the chassis shown in FIG. 1 through the preexisting aperture therein.

As shown in FIG. 2, fastener 50 for the connection of the bracket 20 to the chassis 10 may be a box bolt with a shear rating of almost 18,000 to allow for a simple and quick installation of the system 1. Fastener 50 may also be a bolt, washer, and nut configuration. The system 1 installation preferably lacks any drilling into or welding to chassis 10, although it is understood that the chassis will comprise welds and apertures 11 pursuant to standard manufacture by an OEM.

Figure 3:
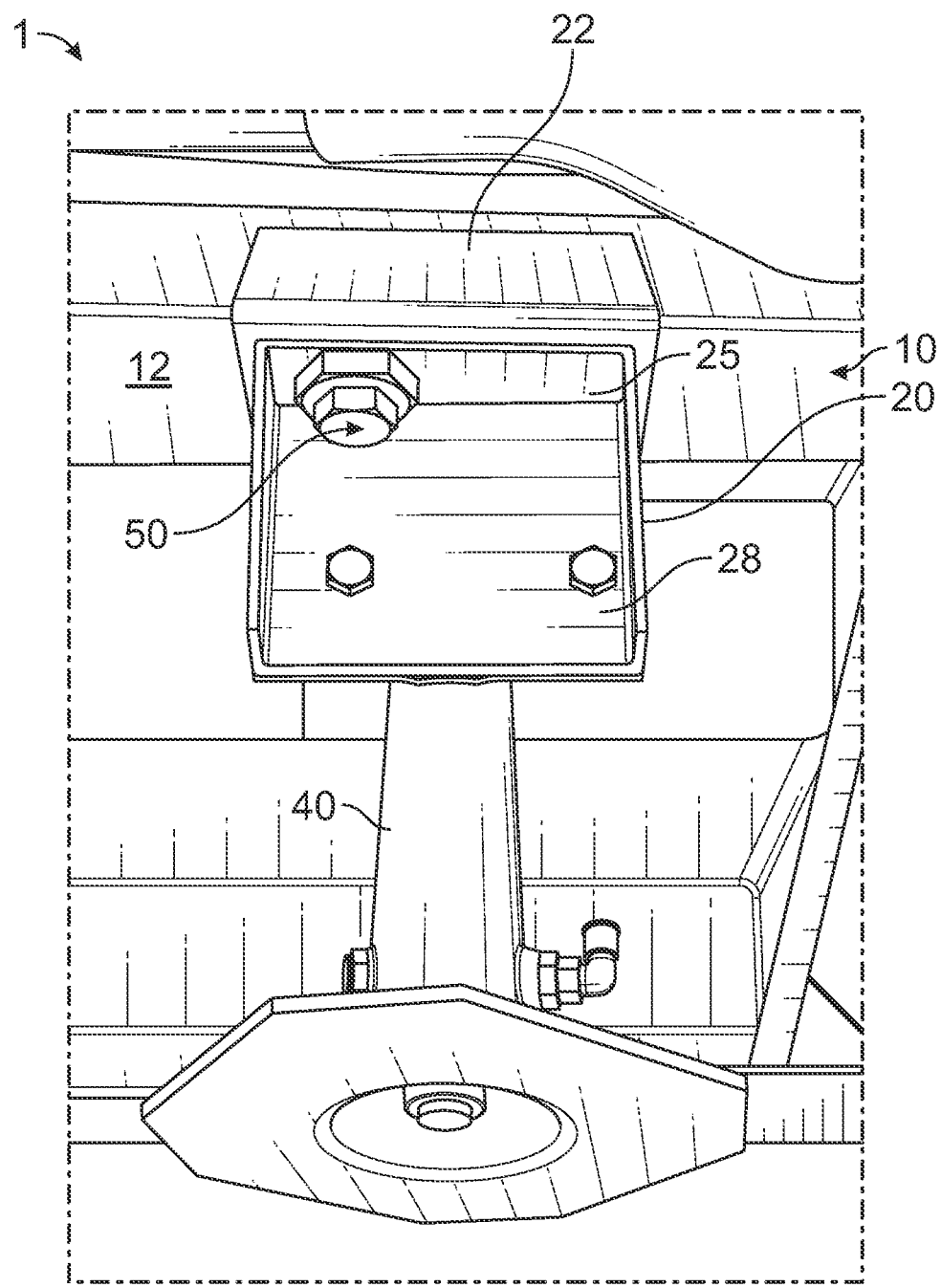
FIG. 3 is a perspective view of a mounting bracket provided in connection with a preferred embodiment of the present invention, shown connected to a chassis and a mounted component at a driver side front portion of the chassis.
Figure 4:
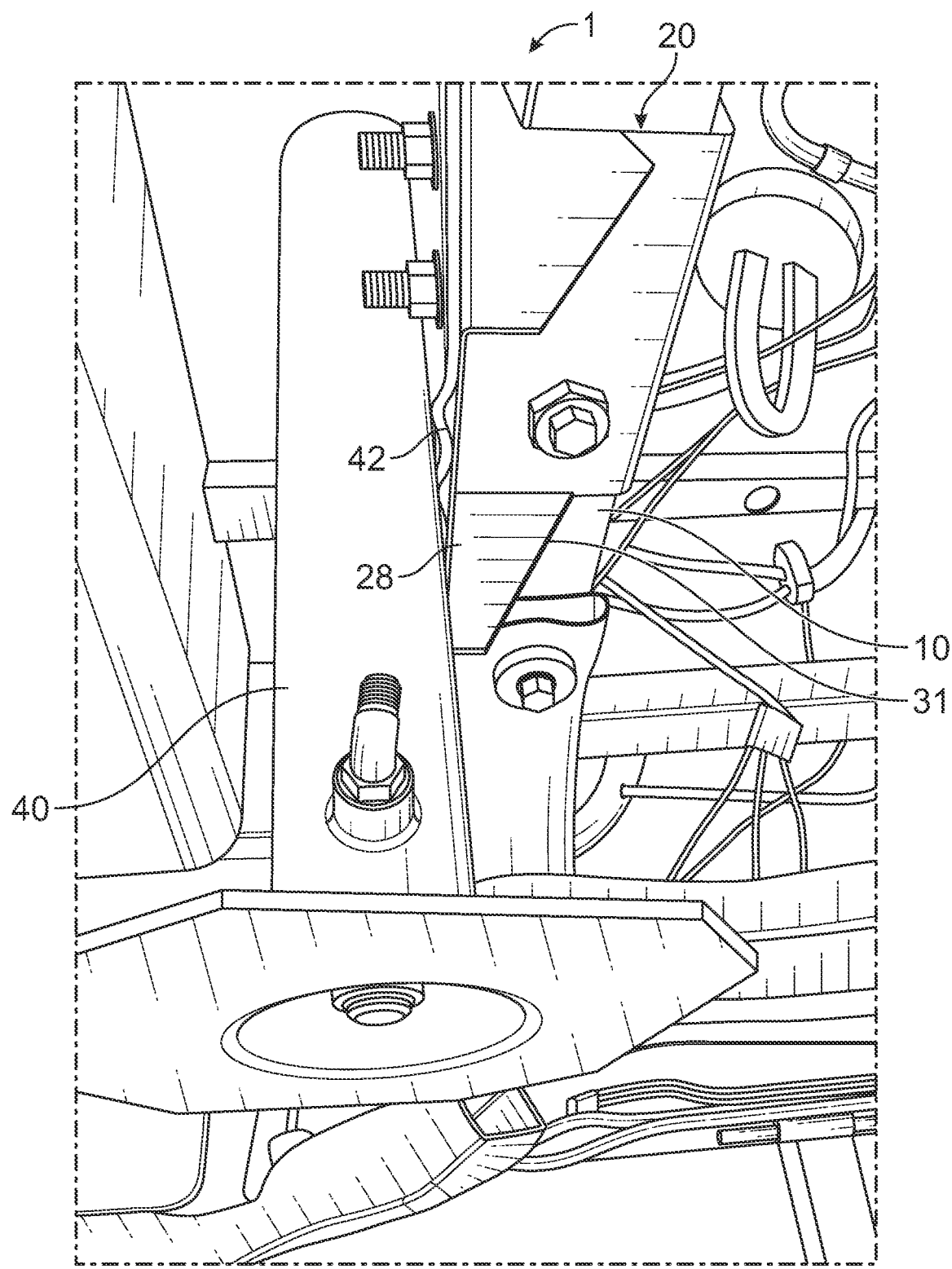
FIG. 4 is another perspective view of a mounting bracket provided in connection with a preferred embodiment of the present invention, shown connected to a chassis and a mounted component at a driver side front portion of the chassis.

As shown in FIGS. 3-4, bracket 20 further comprises the bracket apertures 21, a bracket lip 22 having a first side 23 and a second side 24, a bracket chassis interface 25 having a first side 26 and a second side 27, and a bracket component interface 28 having a first side 29 and a second side 30, and connecting portions 31. The bracket is preferably formed of carbon steel, stainless, steel, an aluminum alloy, or a titanium alloy. Together, the bracket lip 22, bracket chassis interface 25, and the bracket component interface 28 defines a preferably c-shaped channel of the bracket 20 that is attached to the chassis 10.

As further shown in FIGS. 3-14, the system 1 is configured as follows. Bracket aperture 21 is aligned with chassis aperture 11 and the first side 26 is mated with surface 12. Fastener 50 is provided through apertures 11, 21 such that bracket 20 is secured to the chassis 10 without any drilling through or welding thereto. The aperture 21 may be offset from the longitudinal center of the c-shaped channel of the bracket 20. The component 40, such as a leveling jack or leg, is then provided such that component apertures 41 at a mounting plate 42 of the component 40 are aligned with and complementary to additional bracket apertures 21 in the bracket component interface 28. Fastener 50 is then used to secure the component 40 to the bracket 20, wherein the second side 30 of the bracket component interface 28 and the mounting plate 42 are mated, and one or more fasteners 50 are provided through apertures 21, 41 to secure the component 40 to the bracket 20. See also FIGS. 12-14. When the system 1 is installed, lip 22, bracket chassis interface 25, and bracket component interface 28 preferably wrap around surface 12, as best shown in FIGS. 4-7.

Figure 5:
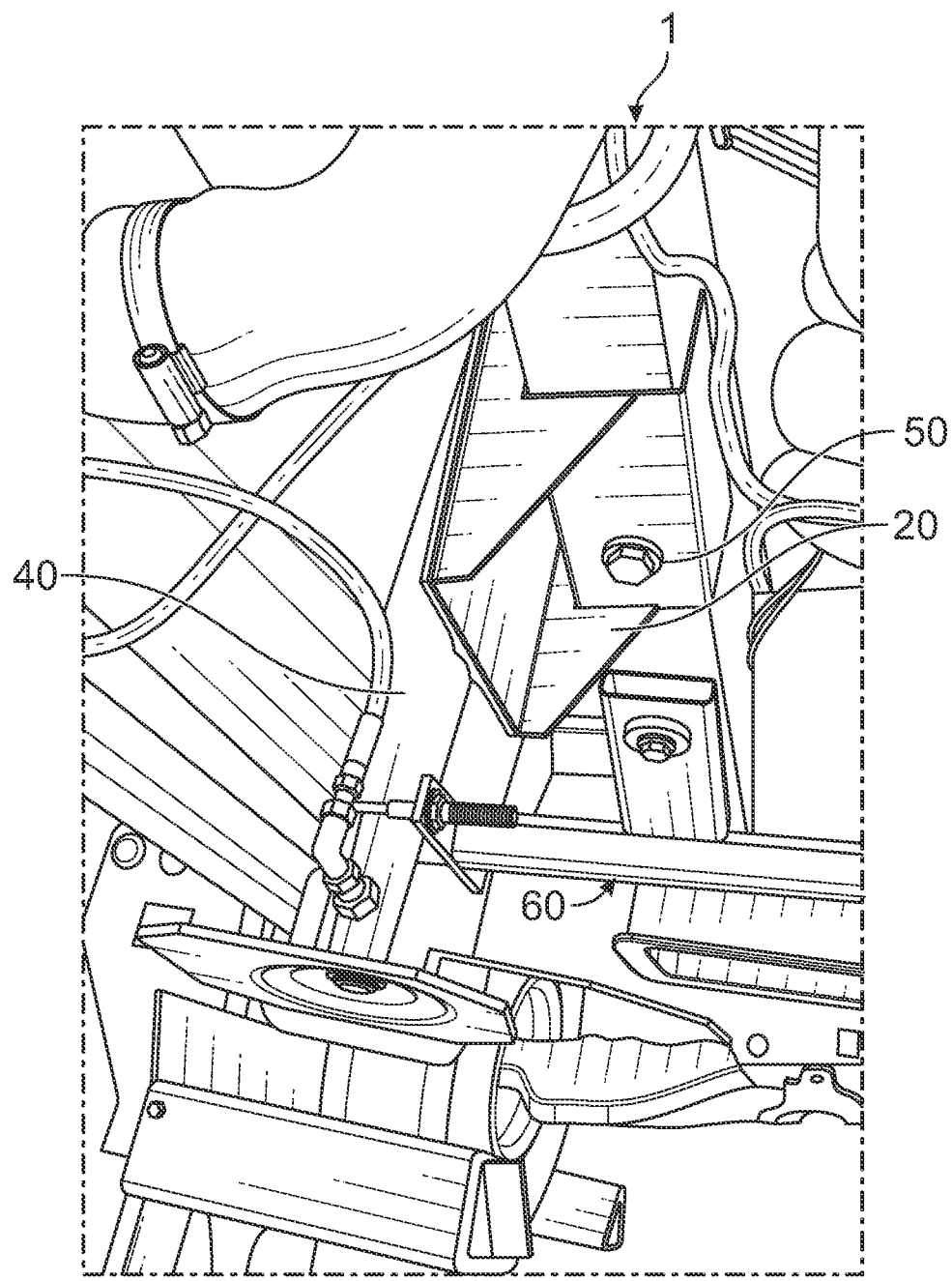
FIG. 5 is another perspective view of a mounting bracket provided in connection with a preferred embodiment of the present invention, shown connected to a chassis and a mounted component and a cross-brace at a driver side front portion of the chassis.
Figure 6:
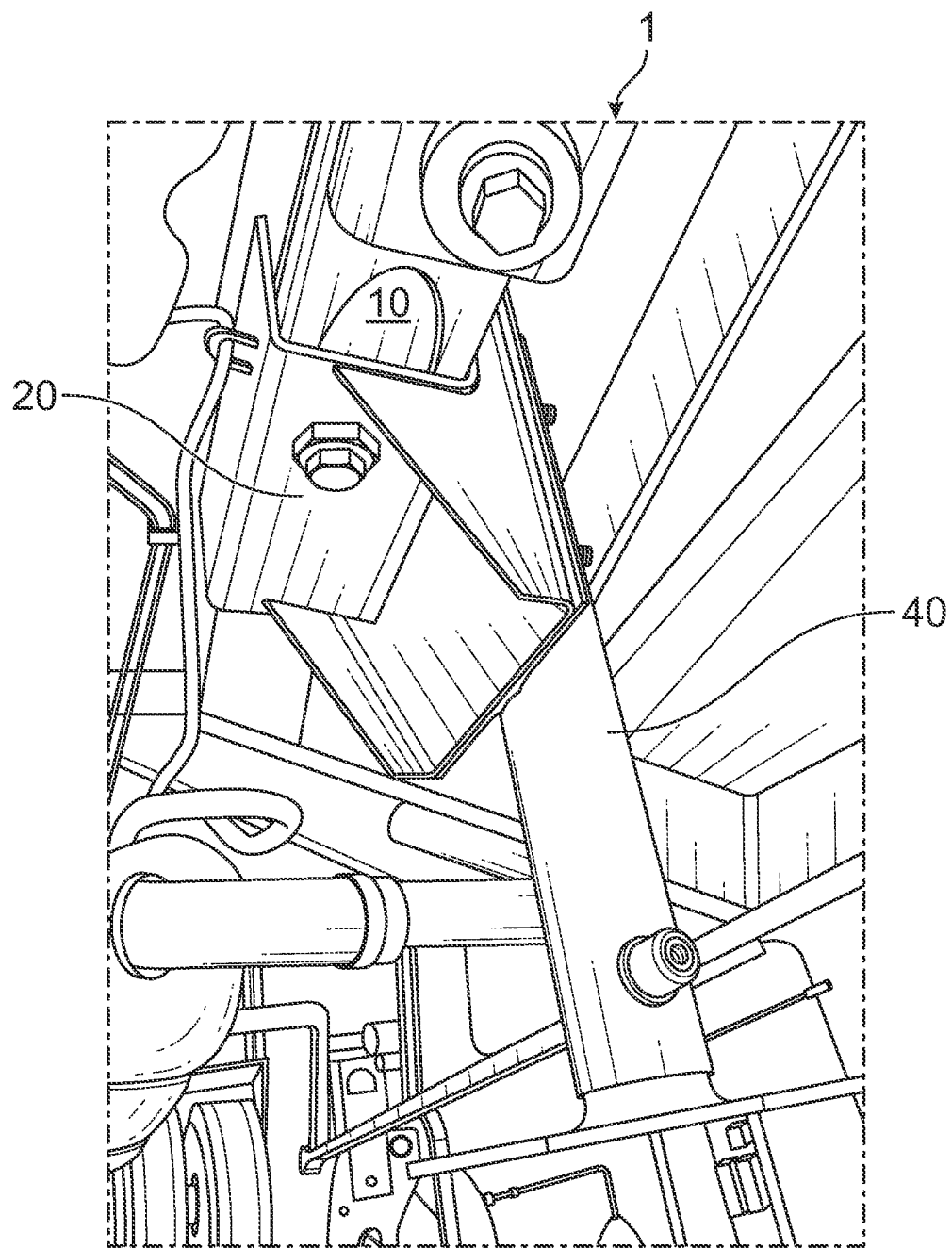
FIG. 6 is a perspective view of a mounting bracket provided in connection with a preferred embodiment of the present invention, shown connected to a chassis and a mounted component at a passenger side front portion of the chassis.
Figure 7:
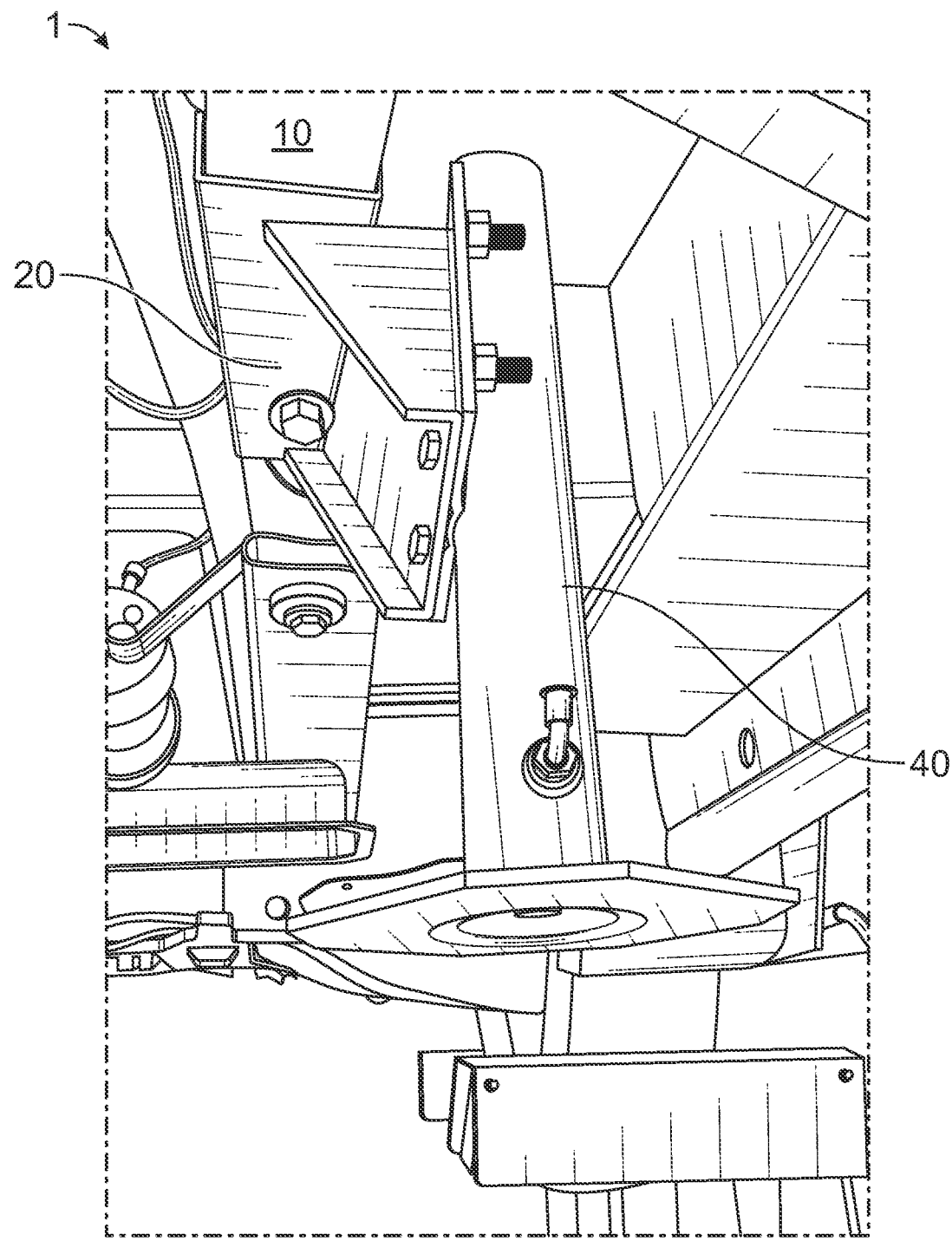
FIG. 7 is another perspective view of a mounting bracket provided in connection with a preferred embodiment of the present invention, shown connected to a chassis and a mounted component at a passenger side front portion of the chassis.
Figure 8:
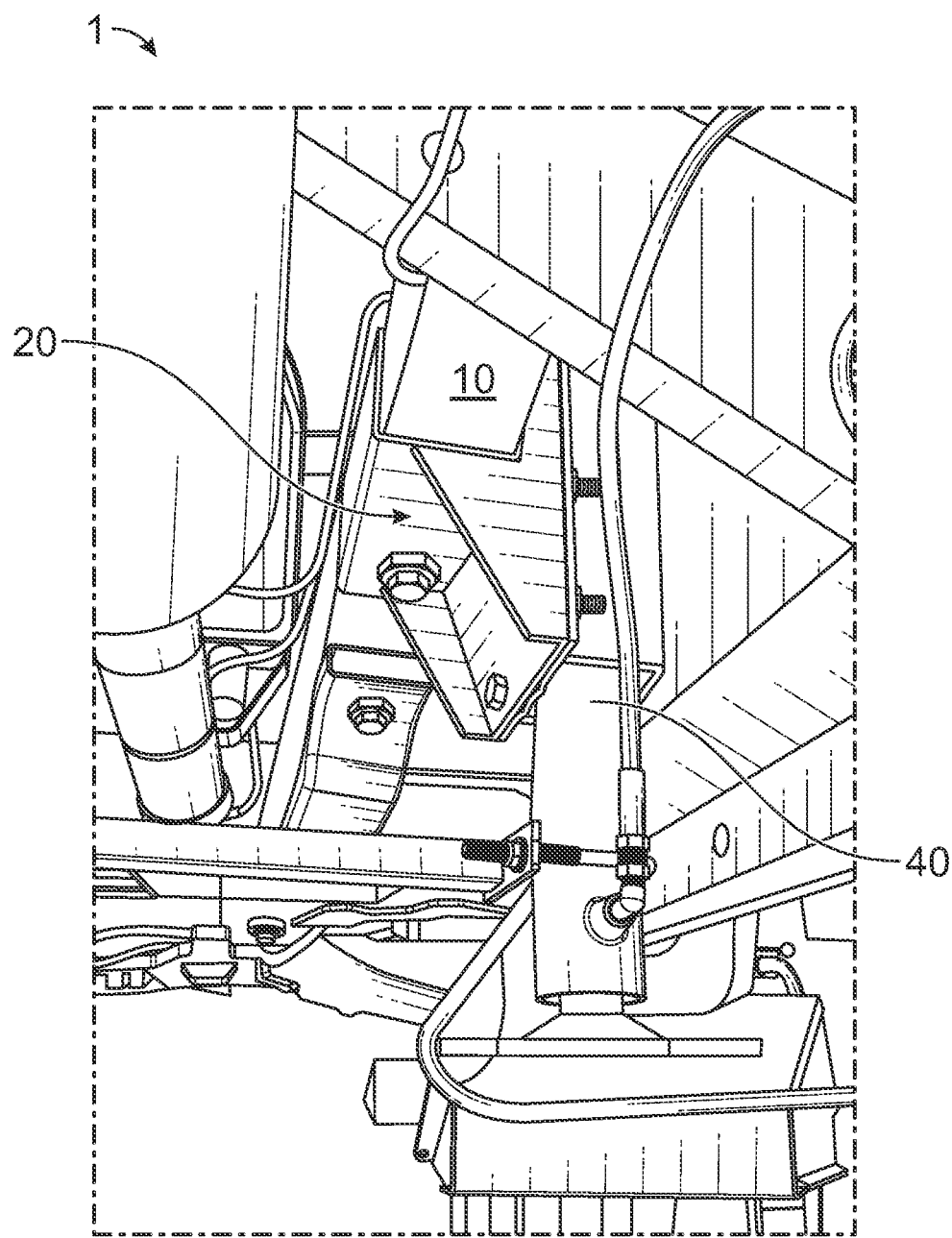
FIG. 8 is another perspective view of a mounting bracket provided in connection with a preferred embodiment of the present invention, shown connected to a chassis and a mounted component and a cross-brace at a passenger side front portion of the chassis.
Figure 9:
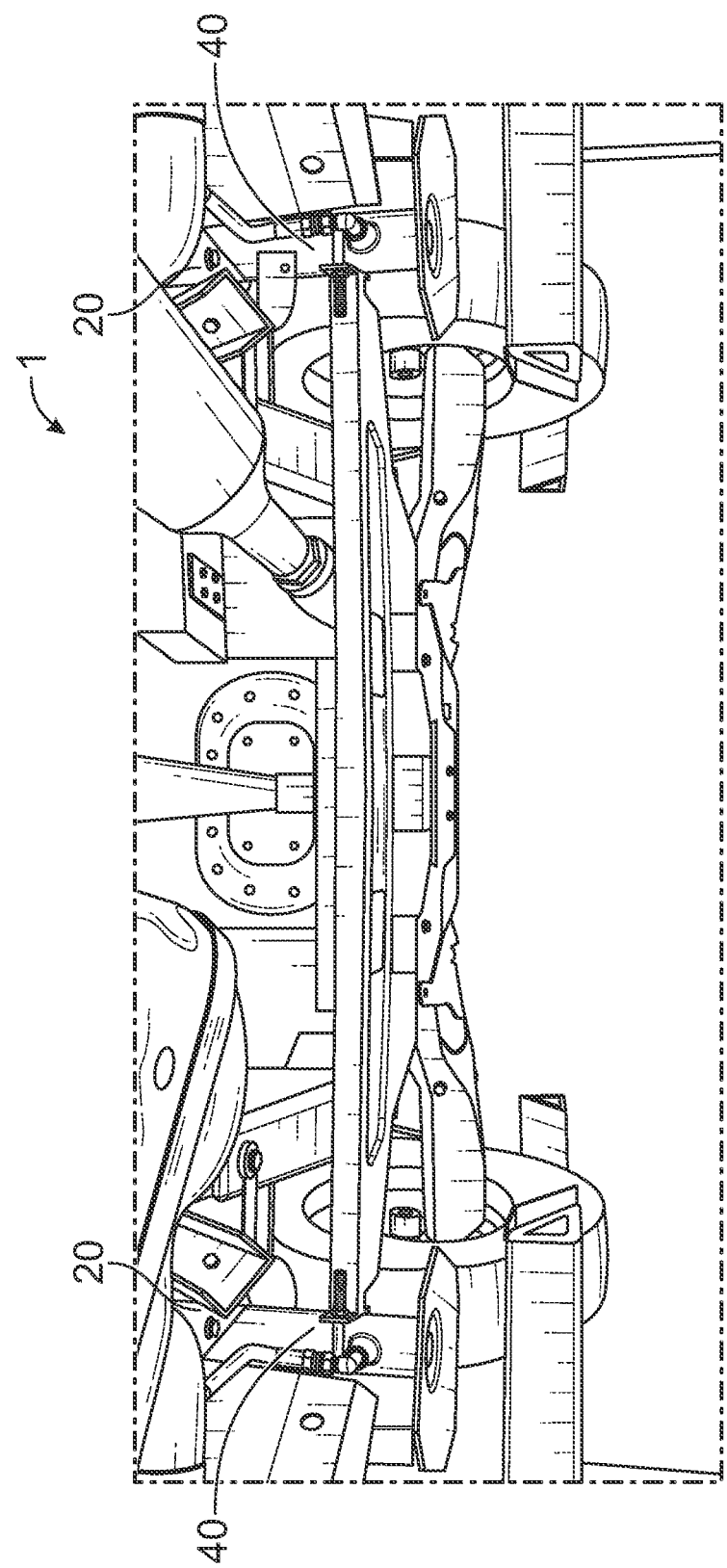
FIG. 9 is a perspective view of a pair of mounting brackets provided in connection with a preferred embodiment of the present invention, shown connected to a chassis and a pair of mounted components and a cross-brace at a front portion of the chassis.
Figure 10:
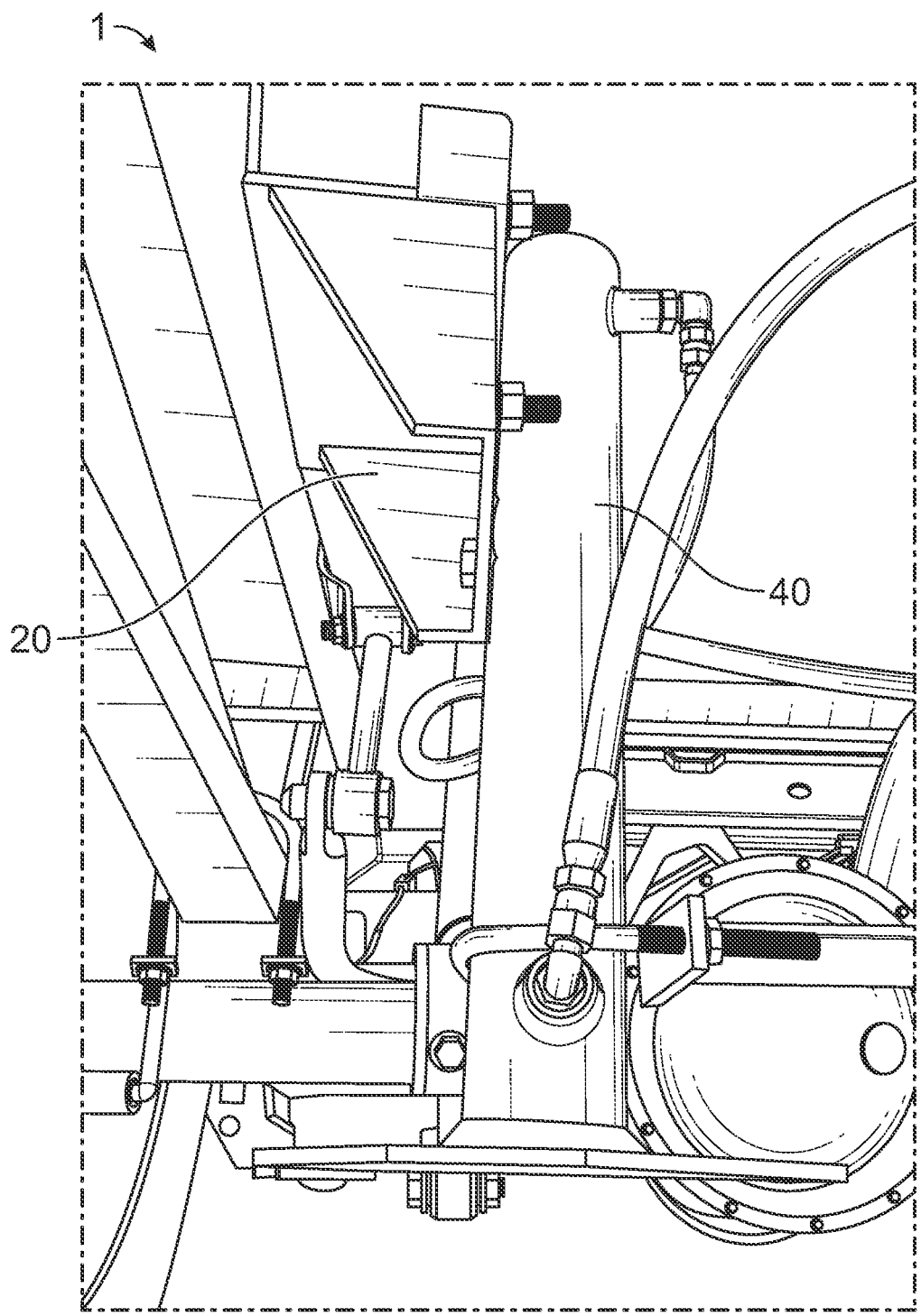
FIG. 10 is a perspective view of a mounting bracket provided in connection with a preferred embodiment of the present invention, shown connected to a chassis and a mounted component at a driver side rear portion of the chassis.
Figure 11:
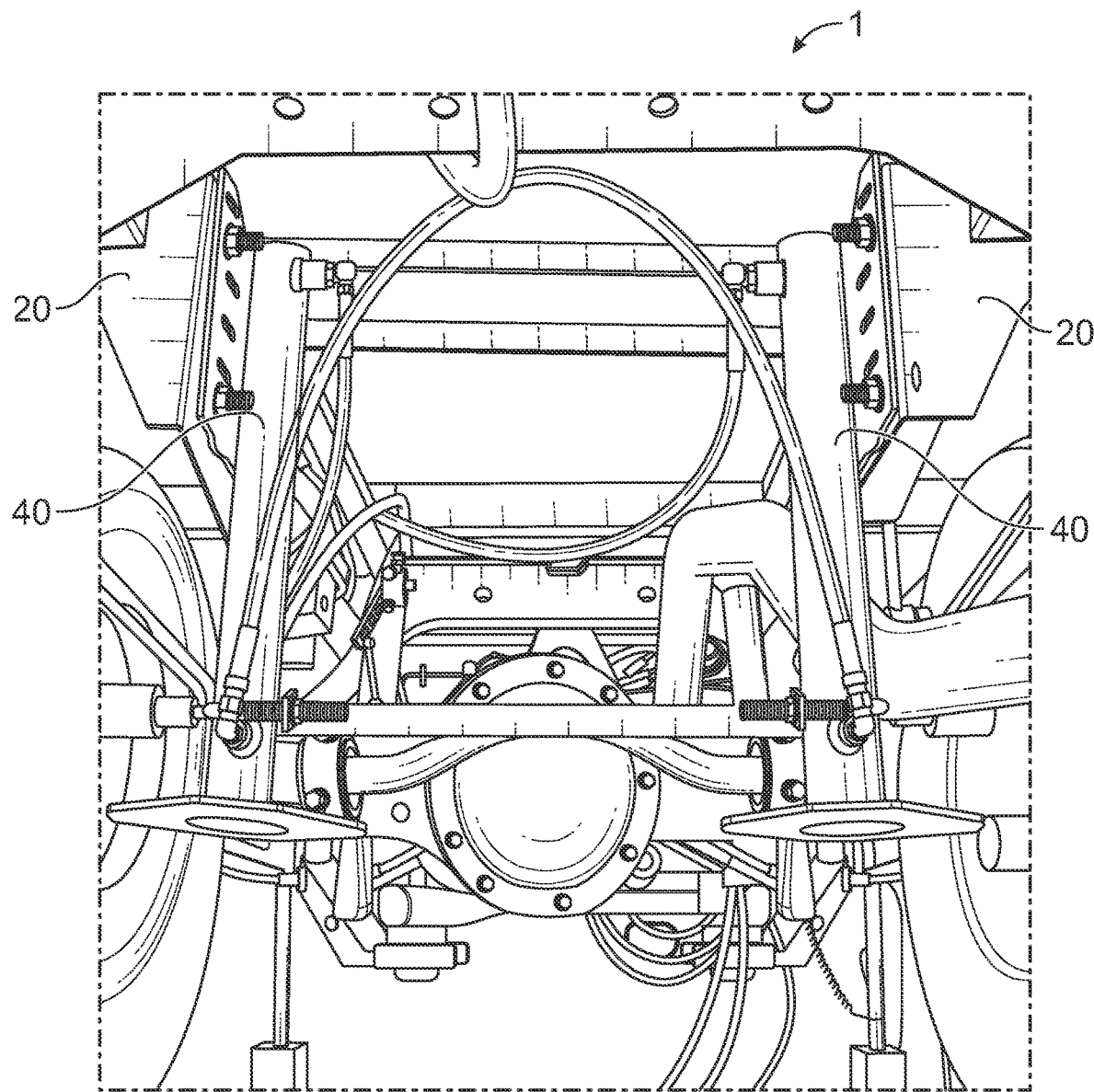
FIG. 11 is a perspective view of a pair of mounting brackets provided in connection with a preferred embodiment of the present invention, shown connected to a chassis and a pair of mounted components and a cross-brace at a rear portion of the chassis.

As shown in FIG. 5, component 40 may be further connected to a cross-brace 60 which preferably is attached to at least two components 40 such that the components 40 are stabilized. For example, one leveling jack 40 may comprise the system 1 installed at a driver side front of chassis 10, another leveling jack 40 may comprise the system 1 installed at a passenger side front of chassis 10, and the cross-brace 60 may be attached to both components 40 at opposite ends of the cross-brace 60, as further shown in FIG. 9. Similarly, a cross-brace 60 may connect two components 40 installed at the rear portion of chassis 10, as shown in FIG. 11.

Figure 12:
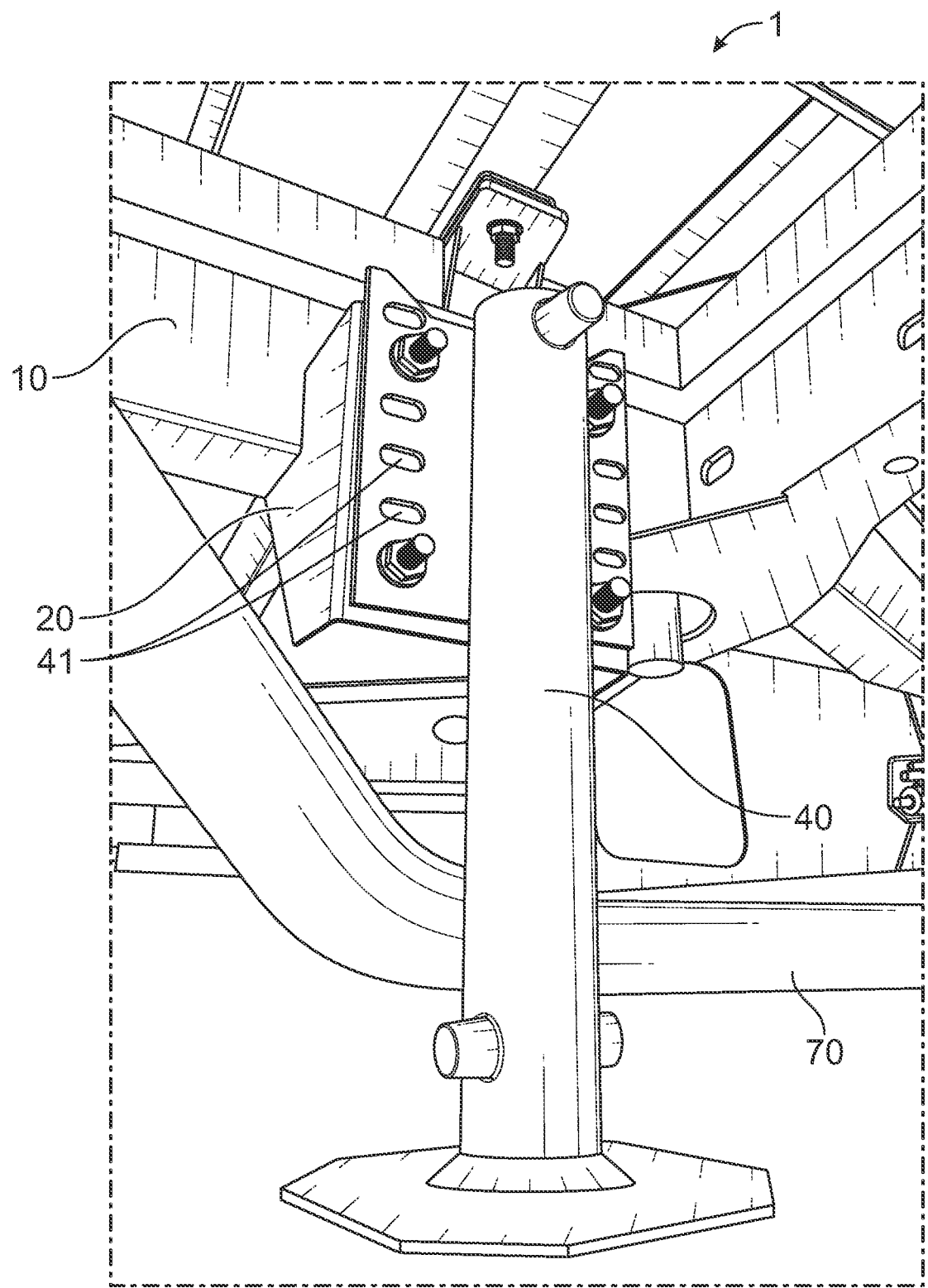
FIG. 12 is another perspective view of a mounting bracket provided in connection with a preferred embodiment of the present invention, shown connected to a chassis and a mounted component at a driver side rear portion of the chassis, wherein an exhaust pipe is shown in position for exhaust to be expelled from behind a rear tire.
Figure 13:
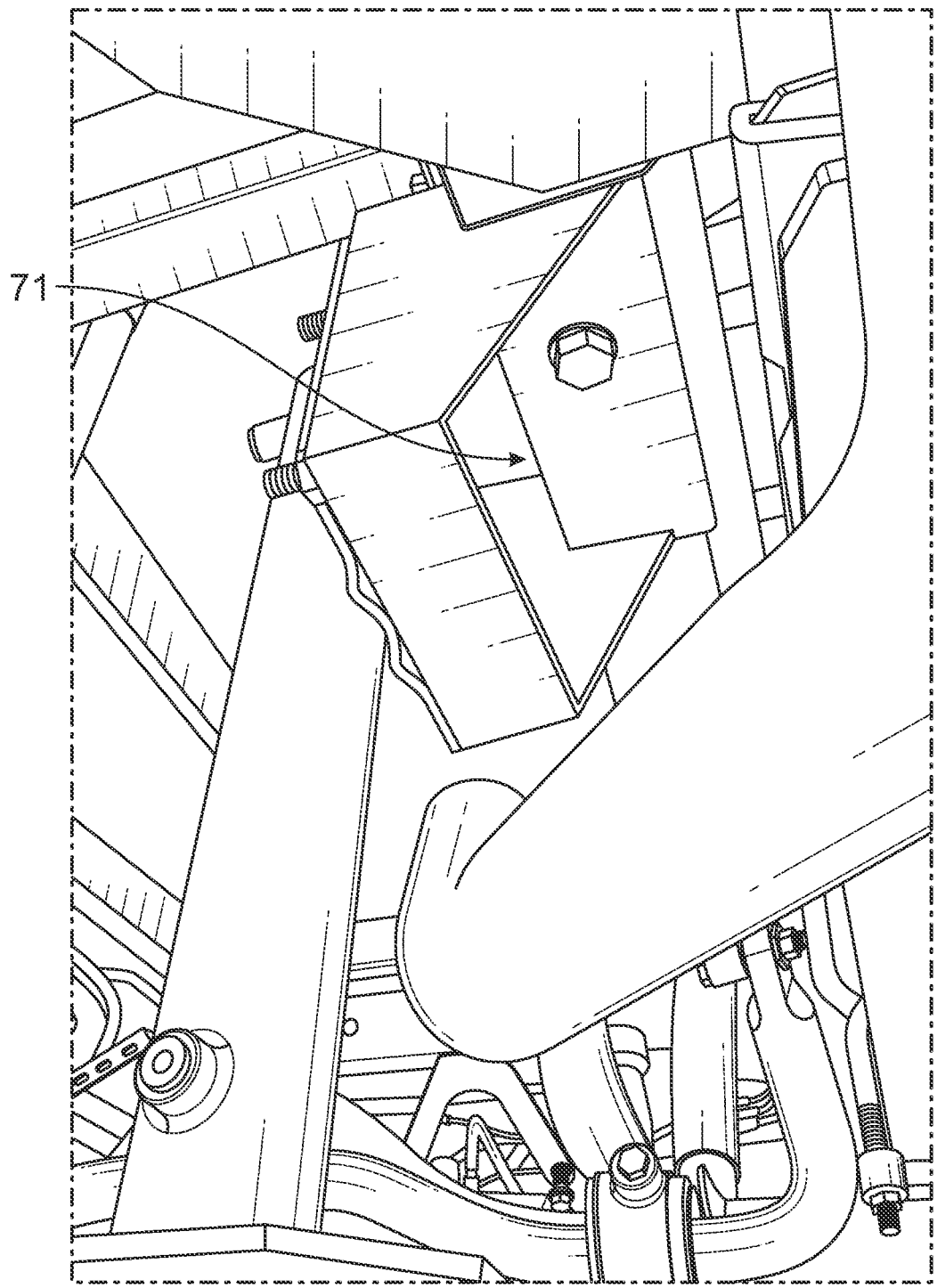
FIG. 13 is another perspective view of an alternative mounting bracket provided in connection with a preferred embodiment of the present invention, shown connected to a chassis and a mounted component at a driver side rear portion of the chassis, wherein an exhaust pipe is shown in position for exhaust to be expelled from in front of a rear tire.
Figure 14:
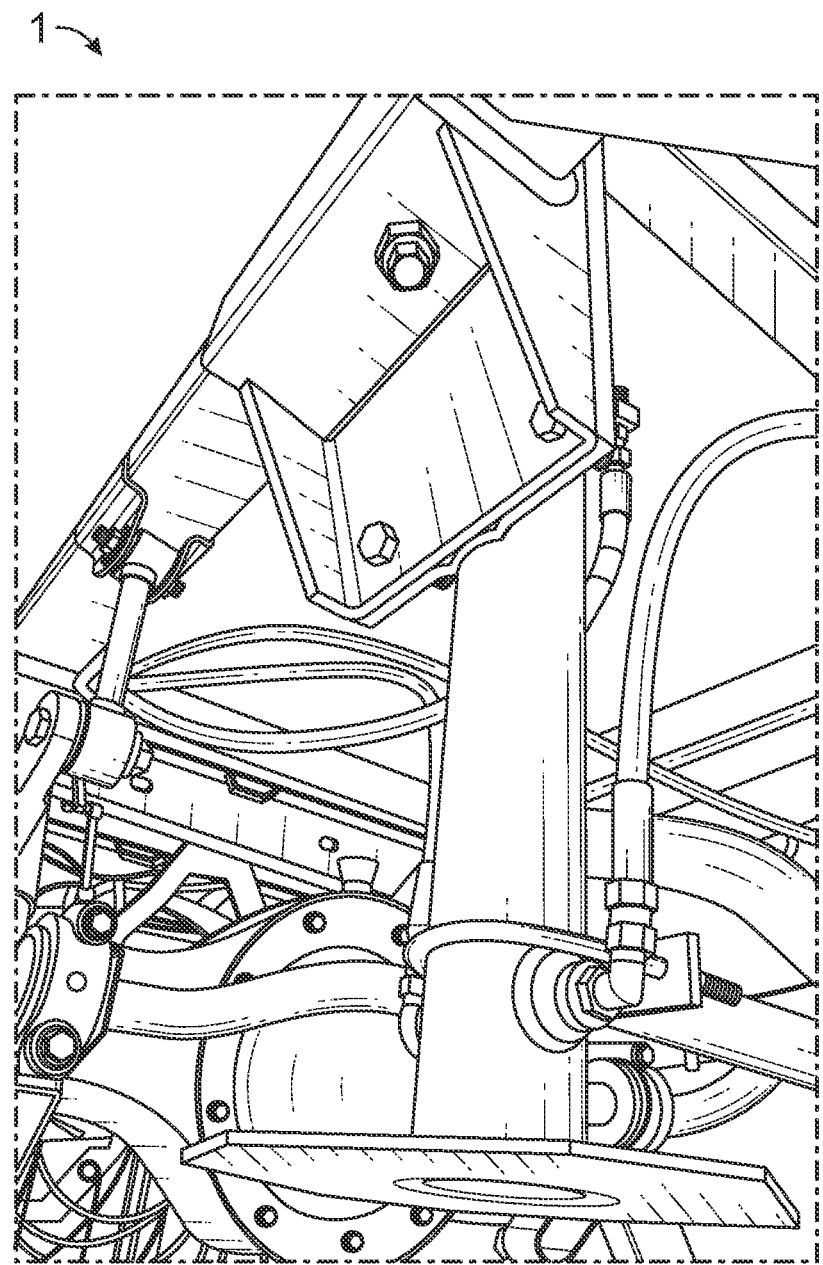
FIG. 14 is another perspective view of a mounting bracket provided in connection with a preferred embodiment of the present invention, shown connected to a chassis and a mounted component at a driver side rear portion of the chassis, wherein an exhaust pipe is shown in position for exhaust to be expelled from in front of a rear axle.
Figure 15:
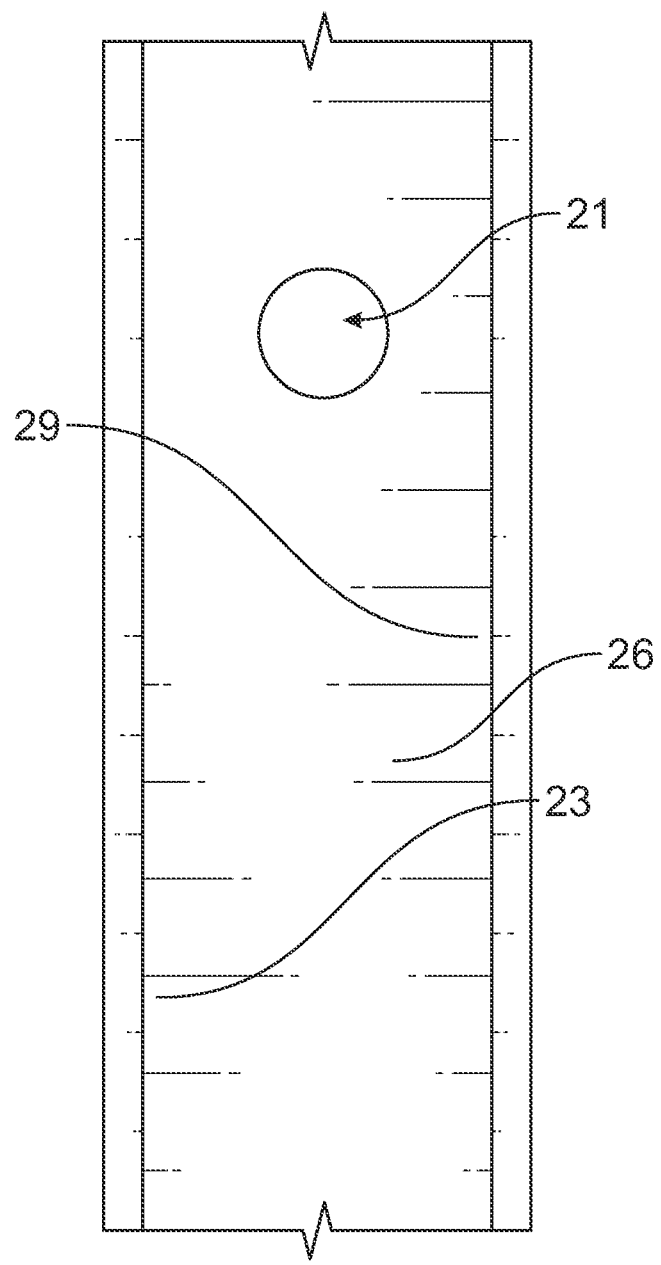
FIG. 15 is a view of a preferably c-shaped portion of the mounting bracket, showing the mounting bracket surfaces that are preferably in direct contact with chassis surfaces.

As further shown in FIGS. 12-14, bracket 20 may be configured and positioned on chassis 10 to allow for proper leeway to accommodate serpentine tubing of a vehicle exhaust system 70. For example, as shown in FIG. 12, bracket 20 of system 1 may be configured to allow for exhaust 70 to be expelled from behind a rear tire of a vehicle. As shown in FIG. 13, in another embodiment of system 1 wherein exhaust 70 runs and is expelled in front of a rear tire, an alternative bracket 20 having a thinner profile and defining aperture 71 between a second lip 72 and bracket component interface 28 may be used. Otherwise the portions of the embodiment shown in FIG. 13 are similar to or the same as the embodiments shown in the other drawings. As shown in FIG. 14, a passenger side rear will use a standard bracket 20 if exhaust 70 is expelled in front of a rear axle of a vehicle.

As shown in FIGS. 1-14, all fasteners 50 are preferably pre-fitted to the bracket 20 for ease of installation of system 1.

Installation of bracket 20 utilizes existing apertures 11 in the chassis 10 that are the OEM's prescribed lift points.

Installation of bracket 20 does not require any drilling or welding of the chassis per OEM requirements.

Installation of bracket 20 can be made utilizing a single fastener 50 through apertures 11, 21 in the chassis 10 to secure the bracket 20 to the chassis 10.

Bracket 20 is designed to cradle the chassis 20 as described above and shown in the Figures to provide a large lifting surface to redistribute the load of the vehicle on the leveling jack 40.

Bracket 20 is designed such that the OEM's frame lift point can still be used by the OEM's repair lifting mechanisms.

System 1 may include the lateral cross-brace 60 to greatly alleviate the side load stress on the frame rails of the chassis 10.

The invention claimed is:

1. A system for securing components to a vehicle chassis, the system comprising:
    a vehicle chassis having sides that define an enclosed channel therethrough and having first, second, and third chassis surfaces and one or more chassis apertures provided along a length of the vehicle chassis;
    a mounting bracket having one or more bracket apertures, a bracket lip, a bracket chassis interface, and a bracket component interface;
    a component having a component bracket interface comprising a plurality of component bracket interface apertures; and
    at least one bracket fastener and at least one component fastener;
    wherein the one or more chassis apertures are complementary to and configured to align together with the one or more bracket apertures;
    wherein the bracket lip has a first side and a second side;
    wherein the bracket chassis interface has a first side and a second side;
    wherein the bracket component interface has a first side, a second side, connecting portions, and a plurality of bracket component interface apertures that are complementary to and configured to align together with the one or more of the component bracket interface apertures;
    wherein the first side of the bracket lip is connected to the first surface of the chassis;
    wherein the first side of the bracket chassis interface is connected to the second surface of the chassis;
    wherein the first side of the bracket component interface is connected to the third surface of the chassis;
    wherein the at least one bracket fastener extends through at least one of the bracket apertures and at least one of the chassis apertures that are aligned together; and
    wherein the at least one component fastener extends through at least one of the bracket component interface apertures and at least one of the component bracket interface apertures that are aligned together.

2. The system of claim 1, wherein the component is a leveling jack.

3. The system of claim 1, wherein the bracket lip, the bracket chassis interface, and the bracket component interface define a c-shaped channel of the bracket.

4. The system of claim 3, wherein the bracket aperture is offset from a longitudinal center of the c-shaped channel.

5. The system of claim 4, wherein the at least one bracket fastener is a box bolt.

6. The system of claim 5, wherein the bracket is formed of carbon steel, stainless, steel, an aluminum alloy, or a titanium alloy.

\* \* \* \* \*